(12) United States Patent
Panabaker et al.

(10) Patent No.: US 7,657,829 B2
(45) Date of Patent: Feb. 2, 2010

(54) AUDIO AND VIDEO BUFFER SYNCHRONIZATION BASED ON ACTUAL OUTPUT FEEDBACK

(75) Inventors: Ruston J. D. Panabaker, Bellevue, WA (US); Adrian Chandley, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 365 days.

(21) Appl. No.: 11/040,546

(22) Filed: Jan. 20, 2005

(65) Prior Publication Data

US 2006/0161835 A1 Jul. 20, 2006

(51) Int. Cl.
*G06F 17/00* (2006.01)
(52) U.S. Cl. .................................................... 715/203
(58) Field of Classification Search .............. 715/500.1, 715/723, 808, 722, 202, 203
See application file for complete search history.

(56) References Cited

U.S. PATENT DOCUMENTS

| | | | | |
|---|---|---|---|---|
| 2,764,628 | A * | 9/1956 | Bambara ..................... 348/809 |
| 5,546,324 | A * | 8/1996 | Palmer et al. .............. 348/14.1 |
| 5,941,953 | A * | 8/1999 | Bergmann et al. .......... 709/234 |
| 6,086,620 | A * | 7/2000 | Oliver et al. .................. 703/13 |
| 6,128,649 | A * | 10/2000 | Smith et al. ................. 709/217 |
| 6,177,775 | B1 * | 1/2001 | Bruington et al. ............ 318/443 |
| 6,262,776 | B1 * | 7/2001 | Griffits ....................... 348/512 |
| 6,518,970 | B1 * | 2/2003 | Glen et al. ................... 345/501 |
| 7,071,971 | B2 * | 7/2006 | Elberbaum ............. 348/211.11 |
| 7,084,898 | B1 * | 8/2006 | Firestone et al. .......... 348/14.09 |
| 7,136,398 | B1 * | 11/2006 | Huart et al. ................. 370/503 |
| 7,239,793 | B2 * | 7/2007 | Sparks et al. ................. 386/46 |
| 7,280,565 | B2 * | 10/2007 | Franke et al. ............... 370/530 |
| 7,324,857 | B2 * | 1/2008 | Goddard ....................... 700/94 |
| 7,434,154 | B2 * | 10/2008 | Konetski ..................... 715/203 |
| 2002/0113800 | A1 * | 8/2002 | Jones et al. .................. 345/589 |
| 2002/0120752 | A1 * | 8/2002 | Logan et al. ................ 709/228 |
| 2002/0152557 | A1 * | 10/2002 | Elberbaum ..................... 8/405 |

(Continued)

FOREIGN PATENT DOCUMENTS

EP      847191 A2 *   6/1998

OTHER PUBLICATIONS

Ito et al., Psychometric Analysis of the Effect of Buffering Control on User-Level QoS in an Interactive Audio-Visual Application, ACM 2004, pp. 2-10.*

(Continued)

*Primary Examiner*—Cong-Lac Huynh
(74) *Attorney, Agent, or Firm*—Workman Nydegger

(57) ABSTRACT

A method and system for keeping endpoints such as speakers and displays synchronized via feedback based on the actual output of the endpoints. A source of audiovisual content transmits corresponding digital data to one or more endpoints, such as over a home network, where it may be buffered and/or decoded for playback. Microphones or the like sense actual (post-buffering/decoding) output from one or more endpoints and feed it back to a synchronization mechanism. The synchronization mechanism employs pattern matching or similar techniques to determine whether and how to adjust the timing of endpoints to synchronize their actual outputs. Synchronization may be accomplished by controllably delaying transmission and/or other processing, by controllably changing the rate of advancing in a buffer, and/or by jumping ahead in a buffer. The synchronization mechanism may adjust multiple endpoints, e.g., when limited buffer size limits the amount of adjustment a single device can provide.

4 Claims, 6 Drawing Sheets

U.S. PATENT DOCUMENTS

| | | | |
|---|---|---|---|
| 2002/0174440 A1* | 11/2002 | Usuba et al. | 725/110 |
| 2003/0002849 A1* | 1/2003 | Lord | 386/46 |
| 2003/0043856 A1* | 3/2003 | Lakaniemi et al. | 370/503 |
| 2003/0122964 A1* | 7/2003 | Hara | 348/515 |
| 2003/0126623 A1* | 7/2003 | Hara et al. | 725/153 |
| 2003/0198257 A1* | 10/2003 | Sullivan et al. | 370/516 |
| 2003/0221161 A1* | 11/2003 | Balassanian et al. | 715/500.1 |
| 2004/0068588 A1* | 4/2004 | Kowalski et al. | 709/248 |
| 2004/0101308 A1* | 5/2004 | Beyette et al. | 398/115 |
| 2004/0182930 A1* | 9/2004 | Nojiri | 235/462.04 |
| 2004/0202263 A1* | 10/2004 | Choi | 375/354 |
| 2005/0039204 A1* | 2/2005 | Neuman et al. | 725/31 |
| 2005/0069286 A1* | 3/2005 | Miyashita et al. | 386/46 |
| 2005/0213731 A1* | 9/2005 | Rodman et al. | 379/202.01 |
| 2005/0219366 A1* | 10/2005 | Hollowbush et al. | 348/193 |
| 2005/0270282 A1* | 12/2005 | Kawaguchi | 345/204 |
| 2005/0276282 A1* | 12/2005 | Wells et al. | 370/503 |
| 2005/0282580 A1* | 12/2005 | Tuori et al. | 455/556.1 |
| 2006/0002681 A1* | 1/2006 | Spilo et al. | 386/46 |
| 2006/0044469 A1* | 3/2006 | Kim et al. | 348/515 |
| 2006/0072395 A1* | 4/2006 | Kobayashi | 369/47.1 |
| 2006/0190968 A1* | 8/2006 | Jung et al. | 725/74 |
| 2006/0193273 A1* | 8/2006 | Passier et al. | 370/310 |
| 2006/0217881 A1* | 9/2006 | Pei et al. | 701/208 |
| 2006/0242314 A1* | 10/2006 | Logvinov et al. | 709/231 |
| 2007/0064901 A1* | 3/2007 | Baird et al. | 379/202.01 |
| 2008/0240686 A1* | 10/2008 | Nagaya et al. | 386/124 |
| 2009/0017866 A1* | 1/2009 | White et al. | 455/556.1 |

OTHER PUBLICATIONS

Hac et al., Synchronization in Multimedia Data Retrieval, Google 1997, pp. 33-62.*

Lienhart et al., Universal Synchronization Scheme for Distributed Audio-Video Capture on Heterrogeneous Computing Platforms, ACM 2000, pp. 263-266.*

Jo et al., Evaluation on the Performance of Adaptive Playout for the Multicast Streaming of Stored Media, IEEE 2003, pp. 542-546.*

Bassoli et al., tunA: Synchronised Music-Sharing on Handheld Devices, Google 2004, pp. 1-2.*

Jo et al., Synchronized Multicast Media Streaming Employing Server-Client Coordinated Adaptive Playout and Error Control, Google Jul. 2002, pp. 1-25.*

Lei et al., Line Feature based Multiple Video Synchronization, Google Scholar, Jul. 2005, pp. 1-8.*

Williams et al., The Impact of Distributed Multimedia System on Computer Support for Co-operative Work, Google 1994, pp. 1-18.*

Cano et al., Voice Morphing System for Impersonating in Karaoke Applications, Google 2000, pp. 1-4.*

Lee et al., Experiences with Processor Reservation and Dynamic QOS in Real-Time Mach, Google 1996, pp. 1-12.*

* cited by examiner

AUDIO AND VIDEO BUFFER SYNCHRONIZATION BASED ON ACTUAL OUTPUT FEEDBACK

FIELD OF THE INVENTION

The invention relates generally to computer networks that transmit audio and video signals, and more particularly to buffered audio and video.

BACKGROUND OF THE INVENTION

Contemporary media systems employ digitally compressed and transported audio and video streams, which typically require buffering during encoding and transmitting at the source and buffering for receiving and decoding at the destination. Buffering inherently includes some amount of delay. In a situation where the media system directly connects to a single endpoint such as a television and/or speakers, there are various adequate solutions to problem of synchronizing the audio output with the video output, because the same endpoint device buffers both sets of data.

A different problem results when multiple output endpoints are being used. For example, consider the same audio being played back on a personal computer and also transmitted to a stereo system in the next room, or to a set of (e.g., wireless) remote speakers that handle such transmitted data. In such a situation, the buffering can cause different amounts of delay on each endpoint. As can be readily appreciated, when a user can simultaneously hear (or see) two signals that are out of synchronization, a highly annoying user experience results.

Inserting synchronization-related codes such as timing signals or the like into the streamed data for each endpoint to process in order to stay synchronized is not an adequate solution in many instances. For one, there are numerous device manufacturers, and no existing transmission protocol standards allow for the transmission of such codes. In the event that such a standard is developed, it would not work with legacy endpoints, and would be costly to implement in many circumstances. For example, any compatible device would have to include the correct processing mechanisms that know how to react to the coding to properly synchronize, and the codes (e.g., timing signals) would have to be extracted from the data in the same way at each endpoint or those timing signals themselves would be out of synchronization.

What is needed is a mechanism that keeps multiple audio-visual-related endpoints synchronized. The mechanism may desirably require limited responsibility and expense at the endpoint.

SUMMARY OF THE INVENTION

Briefly, the present invention provides a system and method by which feedback based on the actual output of one or more endpoints (e.g., a speaker and/or display) is processed to keep the output of multiple endpoints synchronized. In one implementation, one or more microphones sense audio output and feed it back to a synchronization mechanism, such as at the audio and/or video (AV) source device, and/or at one or more of the endpoints. The synchronization mechanism employs pattern matching or similar techniques to determine whether and how to adjust the timing of endpoints synchronize their actual output.

In one example arrangement, an audiovisual (A/V) source device such as a computer system or consumer electronic device provides data from some type of media player for output to a local and remote endpoint, wherein the data may be pre-encoded or encoded at the source. A transmitter transmits the data to another endpoint, such as over a home network. One or more of the endpoints buffers and decodes the data, which may not be done synchronously with another endpoint's output.

An output sensor such as a microphone detects the actual output of one or more of the endpoints, and provides corresponding signals to a synchronization mechanism. In turn, the synchronization mechanism adjusts the relative timing of endpoint's actual output, essentially determining whether to move the endpoint's own playback clock forward or backward, such as by controllably adding delays, controllably advancing in a buffer at different rates (to slow down or speed up an endpoint's output relative to another), or by jumping ahead in a buffer. The adjustment to an endpoint's output may be sudden or gradual, or some combination of both, e.g., to gradually move to a certain threshold of time difference, and then jump.

In one implementation, the output sensor and synchronization mechanism may be independent of the source or remote endpoints. In other implementations, the output sensor may be positioned at the source or the remote endpoint, or both, and the synchronization mechanism may be incorporated into the source or the remote endpoint, or both. The synchronization mechanism may be comprised of multiple synchronization components, such as at the source and at a remote endpoint, that work together. For example, endpoints may essentially report to one another and/or send commands to one another to move forward or backward the endpoint's playback clock, and/or speed up or slow down. The commands may be sent out of band, or in some manner that is part of the actual output but not capable of being sensed by a typical human observer, e.g., via supersonic frequencies. Every capable endpoint may thus participate in the decision, although there also may be a designated master endpoint.

The synchronization mechanism operates by pattern matching, and the source data may be modified in a way that simplifies pattern matching. For example, an audio signal may be mixed with one of a pattern of supersonic frequencies that the sensor and synchronization mechanism can detect to determine synchronization. Alternatively, patterns in the form of control codes may be used, in an implementation in which the decoders can detect such codes. If a camera is used as a sensor of video, a pattern that is likewise imperceptible to typical human observers may be injected into the video signal for sensing.

An external adjustment and delay mechanisms may be used to synchronize two or more endpoints. With respect to delay, the source device or endpoint (sink) may be instructed by the synchronization mechanism to add more or less delay before transmission or playback, to optimize the buffering of content in the sink device. This delay may compensate for delays in networking, including source data transmission and feedback. In general, the synchronization mechanism matches up the audio signal from the source to the content that has been decoded and read from the remote playback buffer, to provide an appropriate delay for synchronized playback of the AV content.

Other advantages will become apparent from the following detailed description when taken in conjunction with the drawings, in which:

BRIEF DESCRIPTION OF THE DRAWINGS

FIG. 3 is a block diagram generally representing an AV source device that provides AV content to endpoints, in which sensors (microphones) are positioned by remote endpoints, and a synchronization mechanism that synchronizes the endpoints is incorporated into the AV source device, in accordance with various aspects of the present invention;

DETAILED DESCRIPTION

Exemplary Operating Environment

Figure 1:
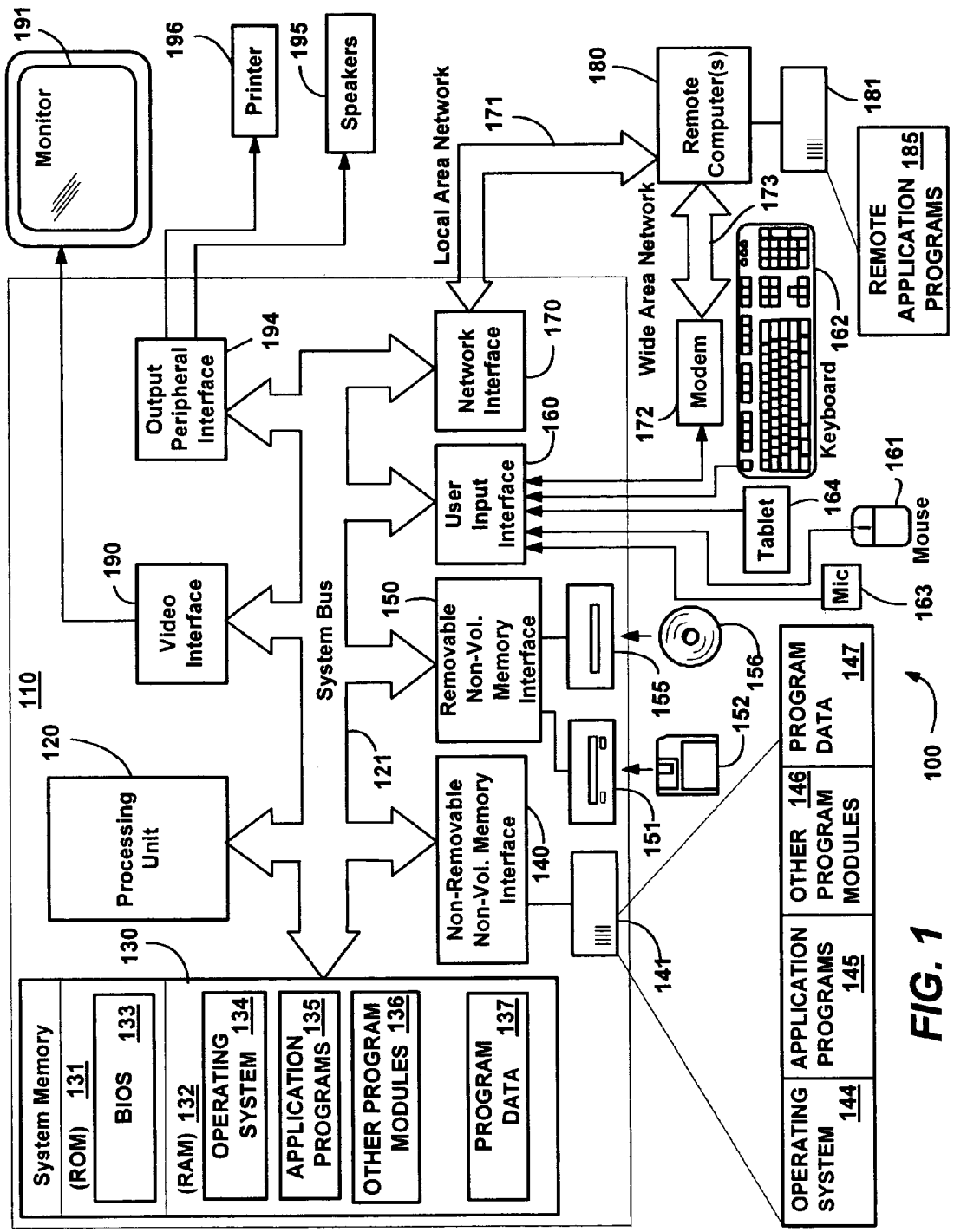
FIG. 1 is a block diagram representing a general purpose computing device in the form of a personal computer system into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Note that as described below, the present invention is generally directed towards data sources, which may, for example, include data sources corresponding to a SQL server and/or XML data provider (web service), that reside on one or multiple remote systems. The computing environment 100 of FIG. 1 is understood to include any local and/or remote source of data, including the SQL server-provided data, web service server provided data, and others.

Synchronization Based on Actual Output Feedback

The present invention is generally directed towards a system and method by which the actual output of an endpoint such as a speaker is sensed, with the sensed output fed back for use in synchronizing an endpoint's output with another endpoint's actual output. For example, a microphone may be employed as a sensor at each endpoint comprising a speaker, and an analysis/adjustment mechanism coupled to the sensor may use a digital or analog pattern matching technique to determine which endpoint is relatively ahead of each other endpoint, and by how much, so that relatively faster endpoints can essentially be instructed to move their playback clocks backward and/or slow down, or relatively slower endpoints can essentially be instructed to move their playback clocks forward and/or speed up, or some combination of both.

As will be understood, there are numerous ways to implement the present invention, including positioning the sensor at various locations, modifying the data sent to an endpoint to help with pattern matching, instructing an endpoint to process its buffered data differently to effectively slow down or speed up, modifying the data sent to an endpoint or the amount of data buffered at the endpoint to essentially make it advance in its playback buffer or increase its size, gradually bringing endpoints into synchronization or doing so in a discrete hop, and so forth. Moreover, certain example techniques described herein may be combined. As such, the present invention is not limited to any particular examples used herein, but rather may be used various ways that provide benefits and advantages in general.

Figure 2:
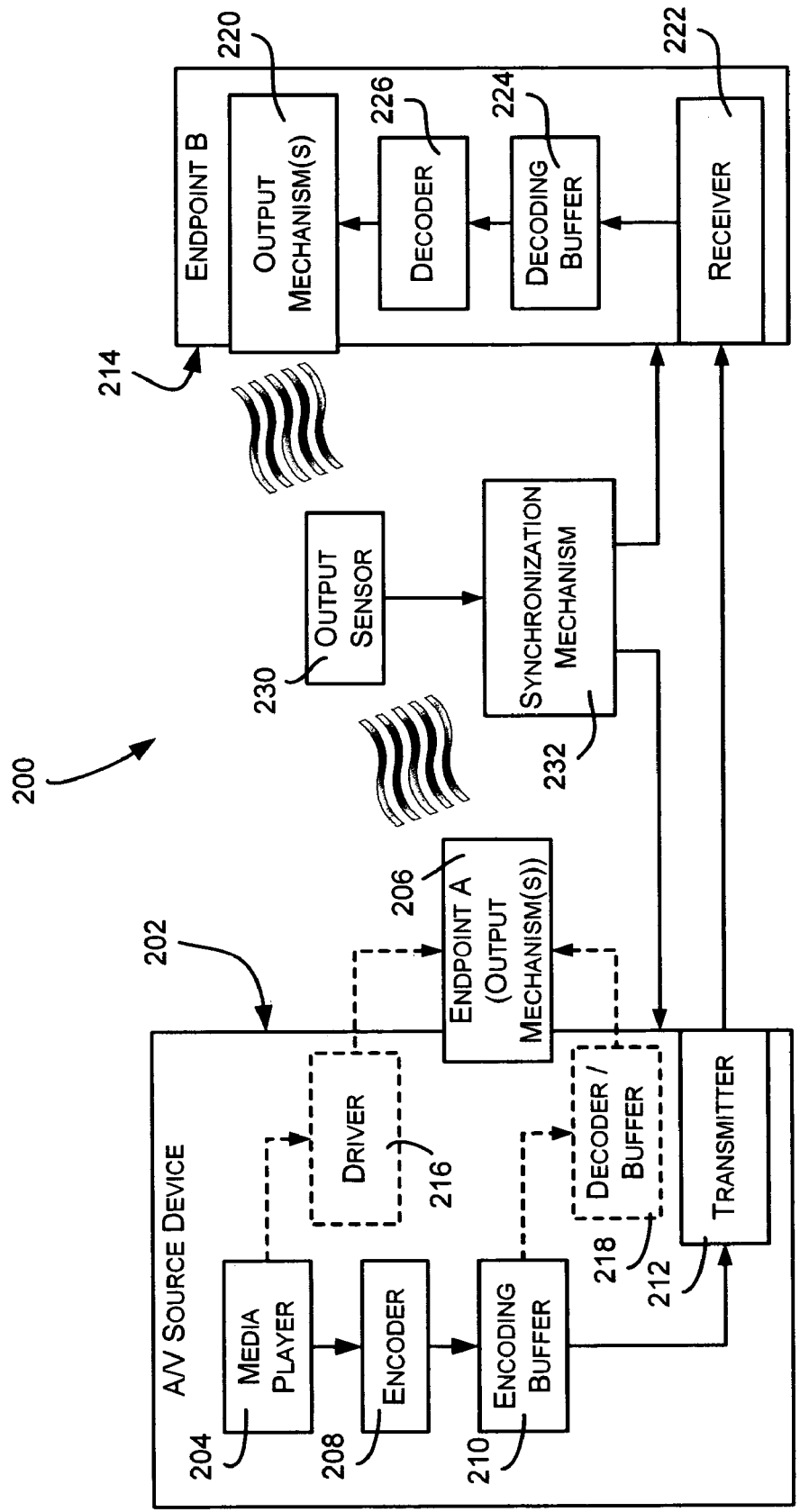
FIG. 2 is a block diagram generally representing an audio and/or visual (AV) source device that provides AV content to endpoints, along with a sensor that senses actual output and a synchronization mechanism that synchronizes the actual output of the endpoints, in accordance with various aspects of the present invention.

FIG. 2 shows an arrangement 200 containing example components into which the present invention may be implemented. In FIG. 2, an audiovisual (A/V) source device 202 such as the computer system 110 or consumer electronic device provides data from some type of media player 204 for output to an endpoint 206, also denoted endpoint A. Types of media players include CD-ROM drives, DVD-ROM drives and computer hard drives, and can be considered as being coupled to any necessary digital rights management mechanisms. As represented in FIG. 2, the media player 204 provides data to an encoder 208 (e.g., for compression and to otherwise format the data as desired). The encoder 208 encodes corresponding encoded data into an encoding buffer 210. A transmitter 212 transmits the data to another endpoint 214, also denoted endpoint B, over virtually any suitable wireless or wired communications means, e.g., wireless IP, Bluetooth, Ethernet, or the like. Note that the content to transmit may already be pre-encoded, in which case the encoder 208 may be bypassed accordingly.

The endpoint A 206 may be a locally connected (e.g., built-in) endpoint such as a PC speaker and/or computer system display. As also represented in FIG. 2, the endpoint 206 can optionally (as represented by the dashed box) receive the data via a driver 216, or receive decoded data extracted from the encoding buffer 210 and decoded via a decoder 218 (including any decode buffer). Note that the dashed boxes representing the driver 216 and decoder 218 also represent any other drivers, amplifier, digital-to-analog converter, display hardware and so forth.

The other endpoint 214, which may also be referred to as a sink device, and which may provide a remote audio and/or video display device as its output mechanism or mechanisms 220, such as a networked television set including speakers, includes a receiver 222 that receives the transmitted encoded data and places that data into a decoding buffer 224. A decoder 226 (which likewise represents any drivers, amplifier, digital-to-analog converter, display hardware and so forth) provides decoded data to the output mechanism or mechanisms 218.

As described above, such a system, without more, has no way to ensure that the decoders are operating on the same data at the same time. The result is that the output mechanisms of the endpoints may be out of synchronization. Within a small environment such as a home, if not synchronized, a person will hear and possibly see the difference, resulting in an annoying or even unacceptable experience. Consider for example, the unacceptability of a system in which the local endpoint is a television screen, along with the left, right and center channel speakers, while the remote endpoints are rear channel left and right speakers that are not synchronized with the local endpoint and/or with one another.

In accordance with an aspect of the present invention, there is provided an output sensor 230 (e.g., a microphone) that receives the actual output of (at least) output mechanism B 220, and provides the actual output in some form to a synchronization mechanism 232. In turn, the synchronization mechanism 232 uses data corresponding to the actual sensed output to determine whether the output mechanism 220 of endpoint B 214 is synchronized with the output mechanism of endpoint A 206. If not synchronized, the synchronization mechanism 232 also determines whether to adjust an endpoint's playback clock and/or effectively speed up or slow down the output of one endpoint to get the system into synchronization. Note that one endpoint may move its clock backward/be slowed while the other is moved forward/sped up to achieve the same result.

As can be readily appreciated, there may be more than two endpoints in a given system that may need to be synchronized. Also, a given sensor may pick up both actual outputs, and/or there may be multiple output sensors. Nevertheless, for purposes of simplicity, FIG. 2 will be described with two endpoints and one output sensor.

Moreover, although FIG. 2 represents an independent output sensor 230 and synchronization mechanism 232, the output sensor 230 may be positioned anywhere, including incorporated into or proximate the source device 202, or incorporated into or proximate the remote endpoint 214. The synchronization mechanism 232 may compare the actual output of the endpoint B 214 to the output of endpoint A in any number of ways. For example, the sensor 230 may detect both actual outputs from the endpoints' output mechanisms 206 and 220, such as the audio output, which if not in synchronization would be detected essentially as an echo, possibly having many seconds difference. Although with only a single output sensor 230 it may not be possible to determine which output mechanism was ahead and which was behind, relatively slowing one down and subsequently again comparing to determine if the separation became shorter or longer would indicate how to proceed.

It should be noted that the actual output need not be sensed after being output by the output mechanism, such as in the example of a microphone detecting speaker output, but instead refers to anything that is nearly-instantaneous with the actual output from the mechanism, such as the actual output from a decoder that (near-instantaneously) drives the output mechanism. Thus, for example, at any endpoint that is a speaker, it is equivalent to have a microphone sense actual sound output and return a corresponding signal, or simply return the signal that near-instantaneously is used to drive the speaker. Moreover, an endpoint can use its internal signal to subtract itself from the microphone-sensed signal, whereby any detected sound is known to be coming from another endpoint or source. Note that using a microphone may be the only feasible way to detect the actual output of legacy endpoints.

Figure 3:
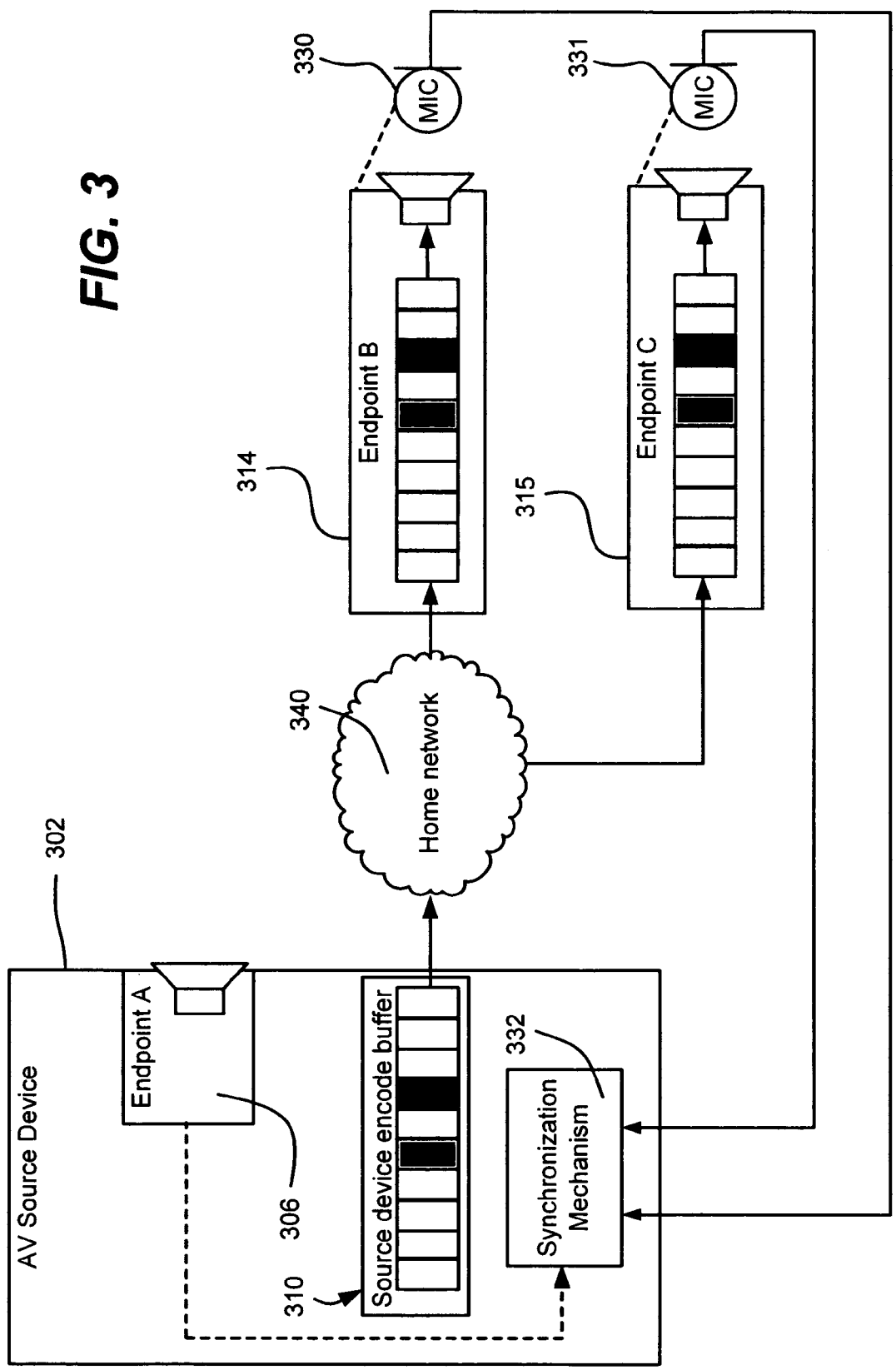
FIG. 3 is a block diagram generally representing an AV source device that provides AV content to endpoints, in which the synchronization mechanism that synchronizes the actual output of the endpoints is incorporated into the AV source device, in accordance with various aspects of the present invention.

FIG. 3 shows an alternative implementation to that of FIG. 2, in which the outputs of three endpoints, endpoint A 306, endpoint B 314 and endpoint C 315 are being synchronized by a synchronization mechanism 332 incorporated into (or closely associated with) an AV source device 302. For example, the synchronization mechanism 332 may be a computer program running in a computer system serving as the A/V source device 302. The endpoints 314 and 315 are remote endpoints that connect to the source via a home network 340. One reason this implementation is desirable is that it may be used with legacy endpoints that do not have any synchronization capabilities.

Further, FIG. 3 represents the use of a microphone at each remote endpoint, which may be desirable, such as if the endpoints are left and right channels (although separate encode buffers may be needed, not shown), and/or if other microphone positions are not suitable, because for example, the output is quiet relative to other sounds. In the example of FIG. 3, the microphones 330, 331 are shown as feeding back to the synchronization mechanism 332 at the source 302, although as can be readily appreciated, the microphones may be fed back through the home network 340. As represented in FIG. 3 by the dashed lines between the endpoints 314, 315 and their respective proximate microphones 330, 331, the microphones optionally may be part of (e.g., built into) their respective endpoints.

Figure 4:
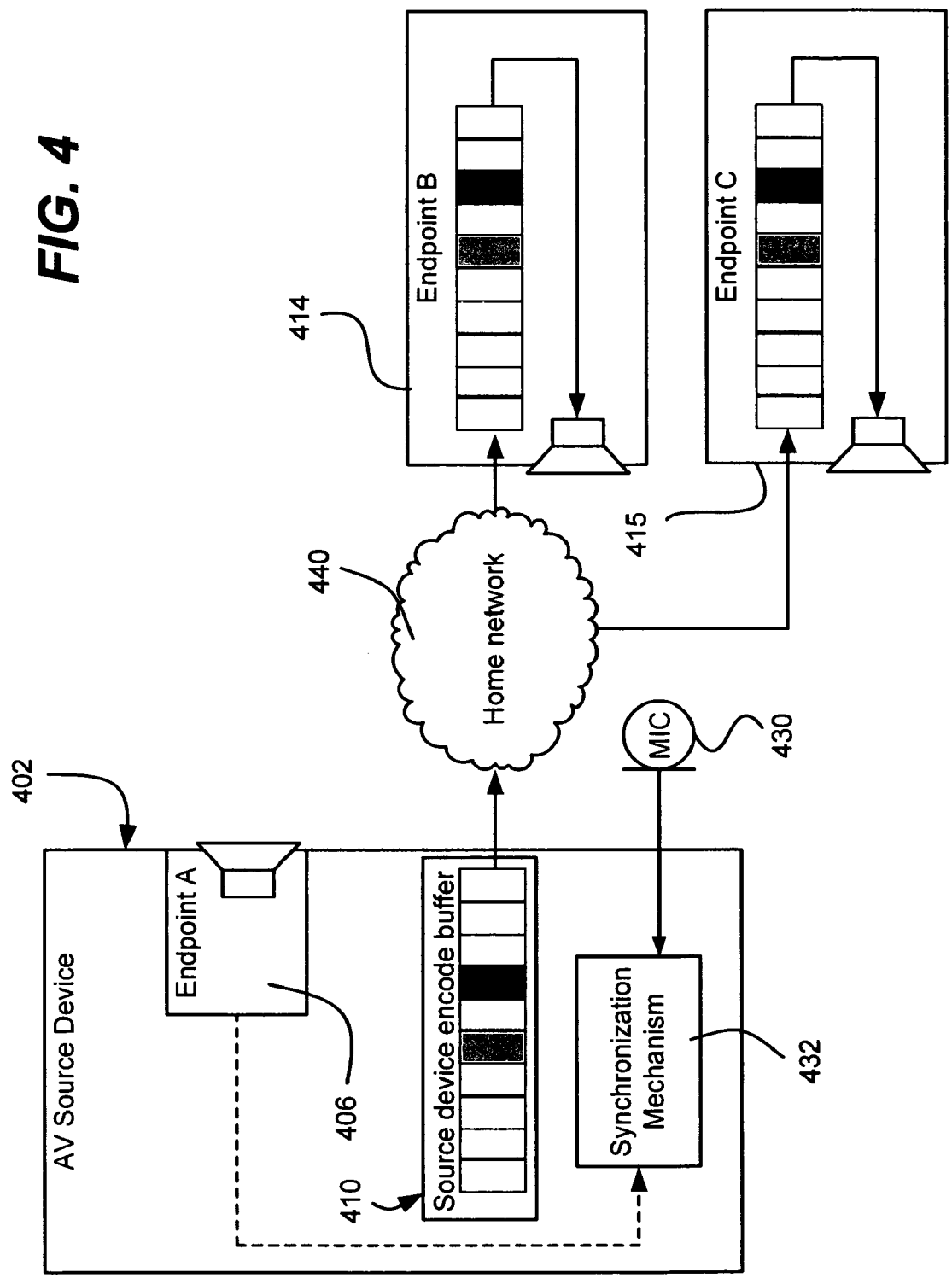
FIG. 4 is a block diagram generally representing an AV source device that provides AV content to endpoints, in which a single sensor (microphone) feeds a synchronization mechanism that synchronizes the endpoints, wherein the synchronization mechanism is incorporated into the AV source device, in accordance with various aspects of the present invention.

Similar to FIG. 3, FIG. 4 shows an implementation in which multiple remote endpoints 414 and 415 connect through a home network 440, but unlike FIG. 3, in FIG. 4 a single microphone 430, suitably positioned such as at the source AV device 402, is used. This is again useful with legacy endpoints, and is advantageous where it is not desirable or feasible to position a microphone at each remote endpoint 414, 415. As such, legacy endpoints can be synchronized without modification to those endpoints or even needing to have a microphone closely associated therewith.

As is apparent from FIG. 4, the audio matching may be performed on the source device 402, instead of independently or at the remote endpoints 414 and 415. In this example, the source device 402 receives signals corresponding to the actual output from the microphone, and pattern matches the audio signal from the sink devices with the local playback on the source device 402. This model has the benefit of allowing the source device 402 to send the content to the remote endpoints 414 and 415, and then only requiring its own local buffer to synchronize playback, either before or after AV decoding. The source device 402 may introduce an artificially larger network delay as a means of synchronizing one or more sink devices (the remote endpoints 414 and 415) that may not know that this technique is being employed. In this example model, it may still be desirable to have a feedback mechanism between the source and sink, especially when there are several sink devices in the system.

In an alternative model, each of the source and the sink devices may have a connected microphone and the ability to pattern match its own playback to the other device or devices. In such a model, it is assumed that the negative feedback model will narrow in on an acceptable difference between the two devices and then stop trying to get closer, unless and until drift occurs. It is generally desirable (but not necessary) to have an out-of-band feedback mechanism in such a model. Note that with a well designed system an out-of-band feedback mechanism is not required, as the source and the sink may each synchronize their own playback by adjusting the playback within the confines of its permissible playback buffers, and resetting as necessary. A system with multiple nodes may be thus synchronized within sufficiently close level of resolution to be effective.

Figure 5:
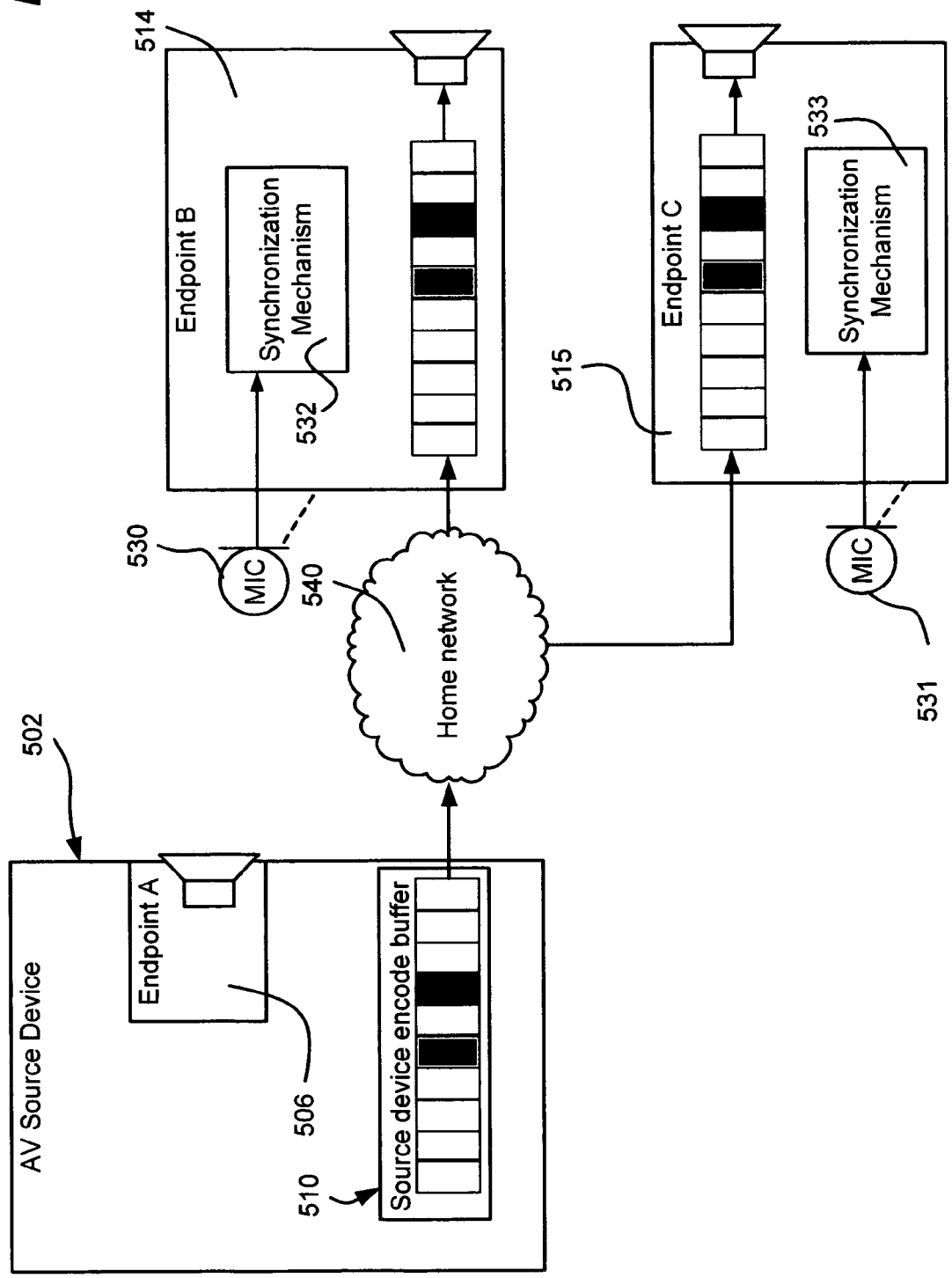
FIG. 5 is a block diagram generally representing an AV source device that provides AV content to endpoints, in which sensors (microphones) feed synchronization mechanisms that synchronize the endpoints, wherein each synchronization mechanism is incorporated into a remote endpoint, in accordance with various aspects of the present invention.

FIG. 5 shows another alternative implementation in which there is a synchronization mechanism 532 and 533 at each of the remote endpoints 514 and 515. These endpoints 514 and 515 are shown with respective microphones 530 and 531, although a shared microphone may be used. In general, the synchronization mechanisms 532 and 5333 synchronize their respective endpoints 514 and 515 to the output of an endpoint 506 at an AV source 502. Note that this implementation is desirable when sophisticated endpoints having synchronization mechanisms are available, because each only needs synchronize to one source, which may be a legacy source device.

In FIG. 5, there is thus shown another example implementation of the invention, in which the remote endpoints 514 and 515 (the two sink devices) are listening to the audio output of the AV source device 502, and using the detected audio signal to match up the local playback of AV content at that node. Each endpoint 514 or 515 does this by adding additional buffering of the media it has received over the network 540 from the source device 502. This implementation provides a solution in which the source device 502 typically introduces sufficient delay before playing, to ensure that there is time for the content to be sent to the endpoints 514 and 515, as well as decoded and buffered thereby. Such a delay can be designed into the system so as to have maximum and minimum acceptable ranges.

In essentially any of the implementations of FIGS. 2-5, the synchronization mechanisms essentially operate by pattern matching to determine how to adjust an endpoint's playback clock and/or speed up or slow down an endpoint. While virtually any known pattern matching technique may be used, whether digital or analog depending on whether the representative signal was digitized, it is also possible to modify the source data in a way that simplifies pattern matching. For example, an audio signal may be mixed with one of a pattern of supersonic (or subsonic) frequencies that the sensor and synchronization mechanism can detect to determine synchronization, e.g., the endpoint A may be outputting the third injected frequency in the pattern while the endpoint B is approximately outputting the fifth, meaning the endpoint A needs to move forward/speed up until both are outputting the same injected frequency at the same time. Alternatively, patterns in the form of control codes may be used, in an implementation in which the decoders can detect such codes.

With respect to moving forward or backward a playback clock and/or speeding up or slowing down an endpoint's output, it can be readily appreciated that this is a relative concept, and can be done in a number of ways depending on the capabilities of a given endpoint. For example, a sophisticated endpoint can be instructed to jump ahead or back in its buffer, or move through the buffer more quickly or more slowly than normal for some amount of time. Conversely, if not sophisticated, such as a legacy endpoint, the encoder at the source device can add data to slow down the remote endpoint or remove data to effectively speed it up. If the local endpoint decodes from the same encoding buffer, however, this will not work unless the local decoder compensates in some way, and thus it may be better to simply control the local decoder differently to adjust its playback clock an/or slow it down or speed it up, e.g., jump ahead or pause, temporarily change the local decoder's decoding rate, or have the local decoder add or remove some of the data.

A system with a legacy speaker may, for example, initially have some delay at its local endpoint or endpoints so that the rest of system always starts behind even the slowest legacy speaker, whereby the master endpoint thereafter moves its clock forward/speeds up (and if necessary later moves its clock backward/slows down) to match the legacy speaker.

Thus, in the above manner it is seen that the adjustment to an endpoint's output may be sudden or gradual, or some combination of both, e.g., to gradually move to a certain threshold of time difference, and then jump. A gradual adjustment may be advantageous when in the middle of a movie or audio track, where a jump or pause at either endpoint would be undesirable. However at other times a jump may be more desirable, such as during startup to get the endpoints starting together, with gradual adjustment thereafter if there is any drift, possibly with an occasional jump to reset exactly every so often.

Moreover, depending on the capabilities of the endpoints' corresponding hardware, it is feasible to have a system in which endpoints essentially report to one another and/or send commands to one another to move its clock forward/speed up or move its clock backward/slow down. The commands may be sent out of band, or (as described above) in some manner that is part of the actual output but not capable of being sensed by a person, e.g., via supersonic frequencies. Every capable endpoint may thus participate in the decision, although there also may be a designated master endpoint.

Figure 6:
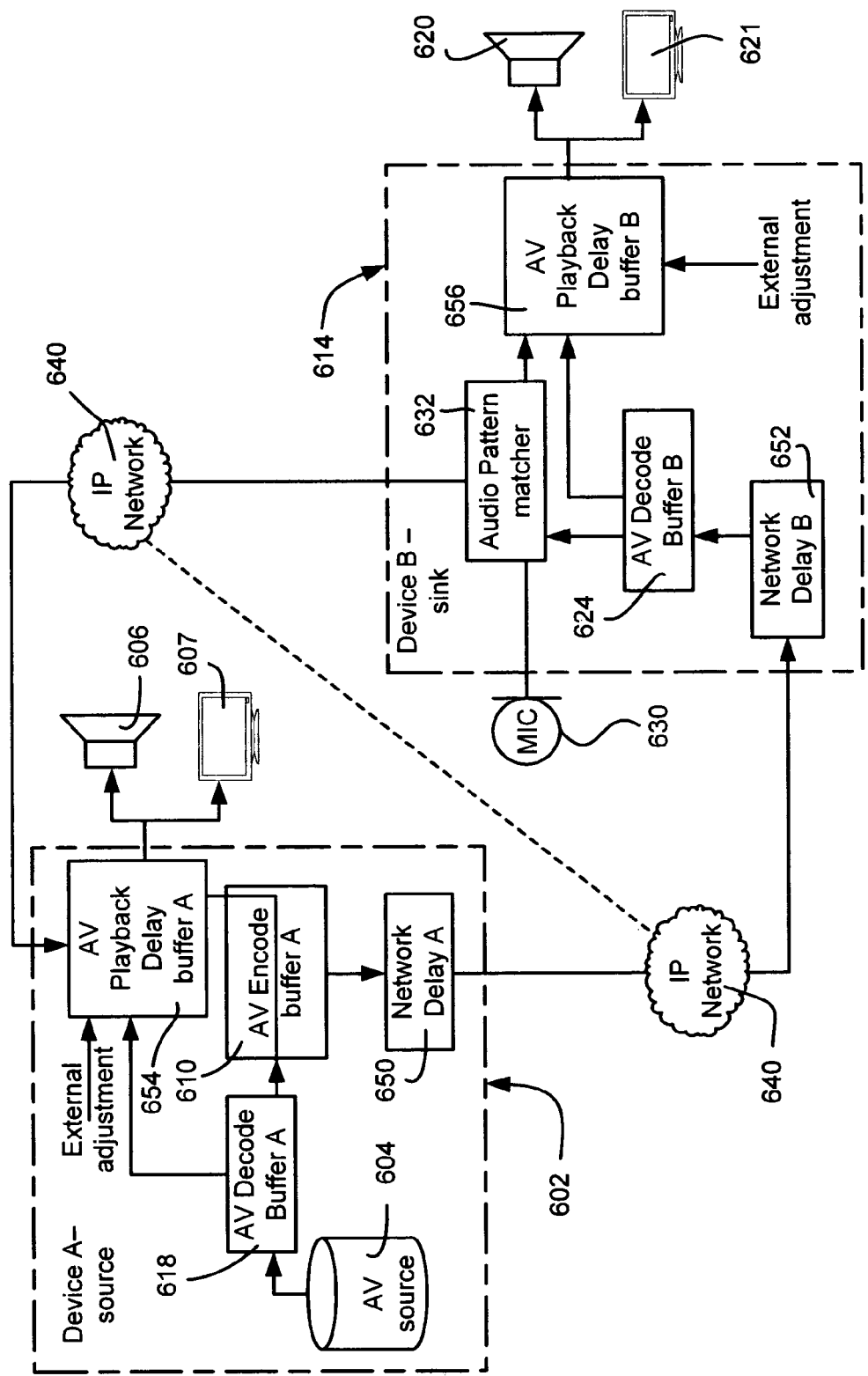
FIG. 6 is a block diagram generally representing an AV source device that provides AV content to endpoints, in which a sensor (microphone) feeds a remote audio pattern matching-based synchronization mechanism that synchronizes the endpoints, including via network delays and/or external adjustments, in accordance with various aspects of the present invention.

In accordance with another aspect of the present invention, FIG. 6 illustrates how an external adjustment and delay mechanisms may be used to synchronize two endpoints. With respect to delay, in FIG. 6, a feedback option is provided to enable the sink device 614 to indicate to the source device 602 whether the source device 602 should add more or less delay before playback, to optimize the buffering of content in the sink device. This feedback mechanism may include the IP network 640 that is being used to send content from the source device 602 to the sink device 614. FIG. 6 also provides for external (e.g., manual) adjustment to the system buffers, to allow the user to match the playback of the local content to what the user is hearing.

FIG. 6 shows the source device's AV decode buffer 618, in which content is decoded from compressed formats such as MPEG, to the raw playback bitstream. FIG. 6 also shows an optional AV encode buffer 610, in which content may be encoded as necessary before sending to the sink device 614, along with a network delay buffer 650, which represents the network queuing and buffering that occur due to the transport mechanism. FIG. 6 also shows the buffers 652 and 624 in the sink device 614, which are needed to decode the content. In general, the pattern matching component 632 matches up the audio signal from the source 614 to the content that has been decoded and read from the playback buffer 656, which is used to provide the appropriate delay for synchronized playback of the AV content.

While the present invention has been primarily described with reference to the actual output of audio signals, it is also feasible to use video information. Video sensing requires a camera-type sensor, which is typically more expensive then a microphone, however in certain instances such as with a computer system, there already may be a camera that can view a remote display. Moreover, the image processing needed to pattern match need not be particularly complex, and may also benefit from having certain information injected into the video signal that is imperceptible to humans. For example, a sensor may detect a particular color pattern that is flashed on only a small corner of the screen for a time that is too brief to be noticed by a person. This detected color pattern may be matched to what it should be to determine whether the remote display was ahead of or behind the local display.

As can be seen from the foregoing detailed description, there is provided a system and mechanism that keeps multiple audiovisual-related endpoints synchronized. The mechanism may desirably require limited responsibility and expense at the endpoint, or even at the source. The invention is extensible and flexible to operate in many different situations. The present invention thus provides numerous benefits and advantages needed in contemporary audiovisual data communications.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a system that includes a first device for transmitting audio signals to a remote endpoint, wherein the first device and the remote endpoint both buffer the audio signals before outputting the audio signals, a method for synchronizing the output of the audio signals between the first device and the remote endpoint, comprising:

the first device transmitting audio signals to the remote endpoint such that the remote endpoint buffers the audio signals in a buffer at the remote endpoint prior to outputting the signals, the first device also buffering the same audio signals in a buffer of the first device;

the first device and the remote endpoint outputting the audio signals; and receiving input from a user at either the first device or the remote endpoint, the user input causing the first device or the remote endpoint to either jump ahead or back in its buffer, or speed up or slow down the rate of output of the audio signals in its buffer.

2. In a system that includes a first device for transmitting audio signals to a remote endpoint, wherein the first device and the remote endpoint both buffer the audio signals before outputting the audio signals, a method for synchronizing the output of the audio signals between the first device and the remote endpoint, comprising:

the first device encoding and transmitting audio signals to the remote endpoint such that the remote endpoint buffers the audio signals in a buffer at the remote endpoint prior to outputting the signals, the first device also buffering the same audio signals in a buffer of the first device;

the first device and the remote endpoint outputting the audio signals; and receiving input from a user at the first device, the user input causing the first device to add data to the audio signals that are encoded and transmitted to the remote endpoint.

3. The method of claim 2, further comprising the user input causing the first device to remove data from the audio signals that are encoded and transmitted to the remote endpoint.

4. The method of claim 2, further comprising the user input causing the first device to temporarily pause the output of the audio signals at the first device.

* * * * *